US010606250B2

(12) United States Patent
Oho et al.

(10) Patent No.: US 10,606,250 B2
(45) Date of Patent: Mar. 31, 2020

(54) PRODUCTION MANAGEMENT DEVICE AND PRODUCTION SYSTEM

(71) Applicant: FANUC CORPORATION, Minamitsuru-gun, Yamanashi (JP)

(72) Inventors: Yuusaku Oho, Yamanashi (JP); Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 70 days.

(21) Appl. No.: 15/902,692

(22) Filed: Feb. 22, 2018

(65) Prior Publication Data
US 2018/0267514 A1    Sep. 20, 2018

(30) Foreign Application Priority Data

Mar. 14, 2017    (JP) ................................. 2017-048065

(51) Int. Cl.
*G05B 13/02*    (2006.01)
*G05B 19/418*    (2006.01)

(52) U.S. Cl.
CPC ..... *G05B 19/4187* (2013.01); *G05B 19/4183* (2013.01); *G05B 19/4188* (2013.01);
(Continued)

(58) Field of Classification Search
CPC .......... G05B 19/41825; G05B 19/4183; G05B 19/4187; G05B 19/4188; Y02P 90/02; Y02P 90/087; Y02P 90/30

See application file for complete search history.

(56) References Cited

U.S. PATENT DOCUMENTS

| 5,757,648 A | 5/1998 | Nakamura | |
| 2001/0052757 A1* | 12/2001 | Sugiyama | G05B 19/182 318/569 |

(Continued)

FOREIGN PATENT DOCUMENTS

| CN | 101118436 | 2/2008 |
| CN | 102736561 | 10/2012 |

(Continued)

OTHER PUBLICATIONS

Office Action dated Sep. 16, 2019 in CN Patent Application No. 201810187259.X with Machine Translation.

(Continued)

*Primary Examiner* — Zhipeng Wang
(74) *Attorney, Agent, or Firm* — Wenderoth, Lind & Ponack, L.L.P.

(57) ABSTRACT

A production management device is communicably connected to a plurality of slave control devices respectively connected to a plurality of machine tools, and also communicably connected to a master control device for preparing an overall operation plan of the plurality of machine tools. The production management device acquires data on a machine type and an operation condition of each of the plurality of machine tools from the slave control device. The production management device selects, on the basis of the data, an alternative machine tool to be substituted for a specific machine tool from among the plurality of machine tools. Furthermore, the production management device substitutes the alternative machine tool for the specific machine tool.

7 Claims, 2 Drawing Sheets

(52) U.S. Cl.
CPC ........ *G05B 19/41825* (2013.01); *Y02P 90/02* (2015.11); *Y02P 90/087* (2015.11); *Y02P 90/30* (2015.11)

(56) References Cited

U.S. PATENT DOCUMENTS

| | | | |
|---|---|---|---|
| 2004/0176870 A1 | 9/2004 | Yokomori et al. | |
| 2006/0079384 A1* | 4/2006 | Yoshida | B23Q 3/15713 483/7 |
| 2015/0293524 A1* | 10/2015 | Sato | G05B 19/4093 700/181 |
| 2016/0327938 A1* | 11/2016 | Kawai | G05B 19/40937 |
| 2017/0010602 A1* | 1/2017 | Iijima | H02P 27/08 |
| 2017/0176980 A1* | 6/2017 | Nishioka | B23Q 3/15713 |
| 2017/0308063 A1* | 10/2017 | Kawai | B23Q 15/00 |
| 2018/0250784 A1* | 9/2018 | Kasahara | B23Q 3/15546 |

FOREIGN PATENT DOCUMENTS

| | | |
|---|---|---|
| CN | 104504540 | 4/2015 |
| CN | 105094092 | 11/2015 |
| EP | 1 162 524 | 12/2001 |
| JP | 2000-250616 | 9/2000 |
| JP | 2001-350510 | 12/2001 |
| JP | 2002-91531 | 3/2002 |
| JP | 2005-346482 | 12/2005 |
| WO | 98/10890 | 3/1998 |

OTHER PUBLICATIONS

Office Action dated Nov. 6, 2018 in corresponding Japanese Application No. 2017-048065.

\* cited by examiner

PRODUCTION MANAGEMENT DEVICE AND PRODUCTION SYSTEM

This application is based on and claims the benefit of priority from Japanese Patent Application No. 2017-048065, filed on 14 Mar. 2017, the content of which is incorporated herein by reference.

BACKGROUND OF THE INVENTION

Field of the Invention

The present invention relates to a production management device and a production system including the production management device.

Related Art

Conventionally, in a production system having a plurality of machine tools, a technique of managing these machine tools to execute an optimum operation plan has been proposed (for example, refer to Patent Documents 1 to 3).
Patent Document 1: Japanese Unexamined Patent Application, Publication No. 2005-346482
Patent Document 2: Japanese Unexamined Patent Application, Publication No. 2001-350510
Patent Document 3: Japanese Unexamined Patent Application, Publication No. 2002-091531

SUMMARY OF THE INVENTION

However, machine tools are of different machine types (for example, lathe, machining center, industrial robots), and their operation conditions (for example, an idle state, a stop state for maintenance or inspection, or an unusable state due to generation of an alarm) are different. Thus, it is difficult to maintain the overall operating rate of the machine tools. For example, suppose a case where a machining process halts because of the stop of a machine tool A. In this case, even if scheduling is configured so as to cause an alternative machine tool B having a similar machine configuration to substitute for the machine tool A in order to prevent a reduction in the overall operating rate, the machine tool B cannot always execute the similar machining process even if the machine tool B uses the same machining program as the machine tool A, because the machine types and other conditions are different between the machine tool A and the machine tool B.

Patent Document 1 merely discloses a technique of preparing a production instruction plan in a machining step with a plurality of alternative facilities. Patent Document 2 also merely discloses a technique of maintaining and managing the lifespan of each of a plurality of machine tools. Furthermore, Patent Document 3 merely discloses a technique of managing a right to use a machining device.

Taking such circumstances into consideration, the object of the present invention is to provide, in a production system having a plurality of machine tools, a production management device and a production system capable of maintaining an overall operating rate of the machine tools.

(1) A production management device (for example, a production management device 3, which will be described below) according to the present invention is communicably connected to slave control devices (for example, slave control devices 4, which will be described below) respectively connected to a plurality of machine tools (for example, machine tools 5, which will be described below), and is further communicably connected to a master control device (for example, a master control device 2, which will be described below) for preparing an overall operation plan of the plurality of machine tools. The production management device includes a data acquisition unit (for example, a data acquisition unit 32, which will be described below) for acquiring data on a machine type and an operation condition of each of the plurality of machine tools from the slave control device, a machine selection unit (for example, a machine selection unit 33, which will be described below) for selecting, on the basis of the data acquired by the data acquisition unit, an alternative machine tool (for example, an alternative machine tool 5B, which will be described below) to be substituted for a specific machine tool (for example, a specific machine tool 5A, which will be described below) from among the plurality of machine tools, and a machining instruction unit (for example, a machining instruction unit 34, which will be described below) for giving the slave control device a command to substitute the alternative machine tool selected by the machine selection unit for the specific machine tool to perform machining based on the operation plan prepared by the master control device.

(2) In the production management device according to (1), the machine selection unit may select, as the alternative machine tool, one of the machine tools of the same type as the specific machine tool and with a lower operating rate than the specific machine tool.

(3) In the production management device according to (1) or (2), the machining instruction unit may provide the slave control device with a machining program to be executed by the alternative machine tool when the machining instruction unit gives the slave control device the command to substitute the alternative machine tool for the specific machine tool.

(4) A production system (for example, a production system 1, which will be described below) according to the present invention includes the production management device (for example, the production management device 3, which will be described below) according to any one of (1) to (3), the master control device (for example, the master control device 2, which will be described below) and the slave control device (for example, the slave control device 4, which will be described below) communicably connected to the production management device.

(5) In the production system according to (4), the slave control device may have an automatic adjustment function for automatically adjusting a mechanism driven by an electric motor of the machine tool on the basis of the machining program executed by the machine tool, and the machining instruction unit may give the slave control device a command to automatically adjust the alternative machine tool when the machining instruction unit gives the slave control device the command to substitute the alternative machine tool for the specific machine tool.

(6) In the production system according to (5), the slave control device may adjust at least one of a gain and a filter of the electric motor of the alternative machine tool in order to achieve the automatic adjustment function for the alternative machine tool.

(7) In the production system according to (5) or (6), the slave control device may achieve the automatic adjustment function for the alternative machine tool on the basis of an operating condition of the alternative machine tool.

The present invention enables, in a production system having a plurality of machine tools, the provision of a production management device and a production system capable of maintaining an overall operating rate of the machine tools.

DETAILED DESCRIPTION OF THE INVENTION

First Embodiment

Figure 1:
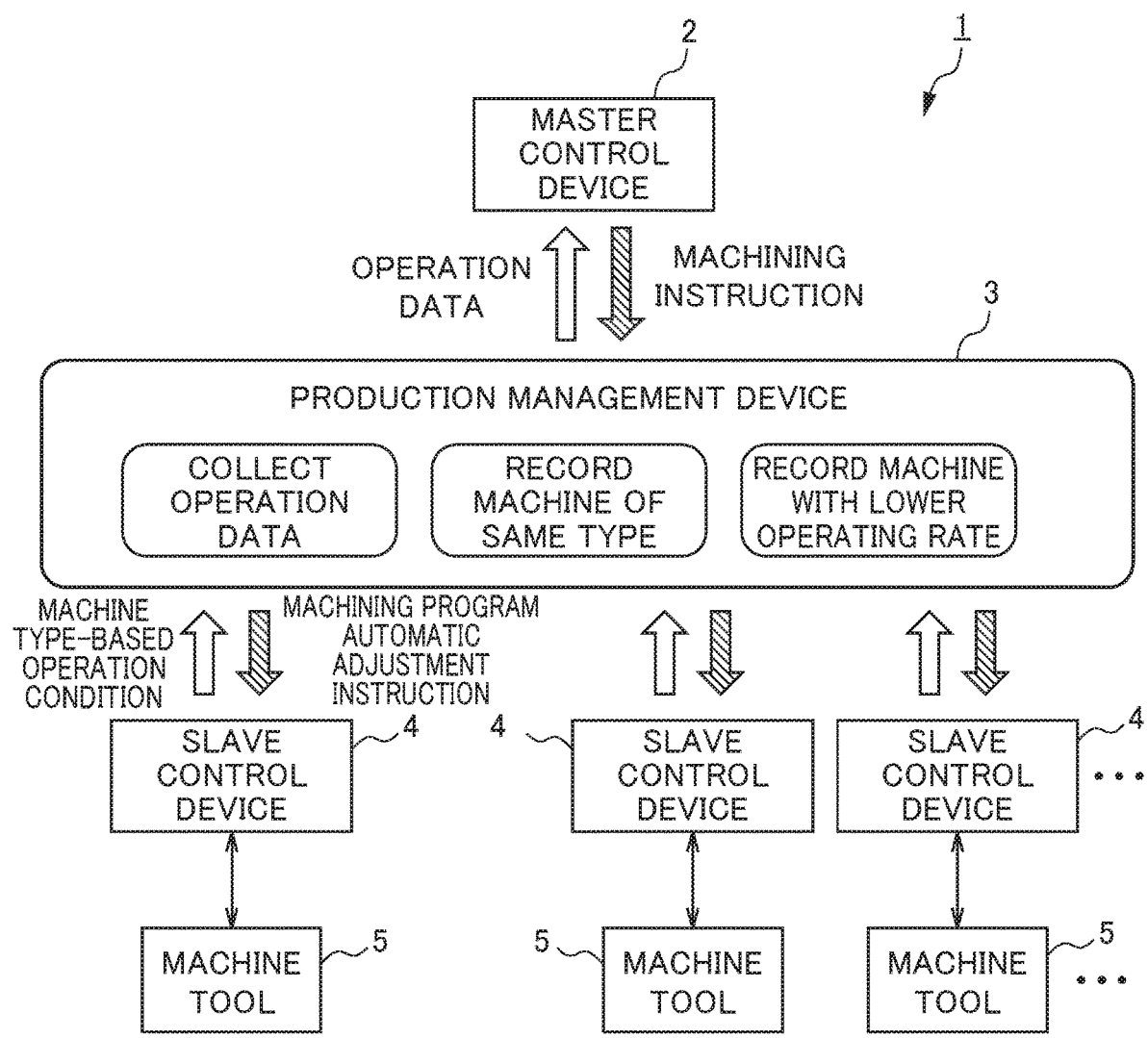
FIG. 1 is a diagram illustrating an overall configuration of a production system according to a first embodiment of the present invention.
Figure 2:
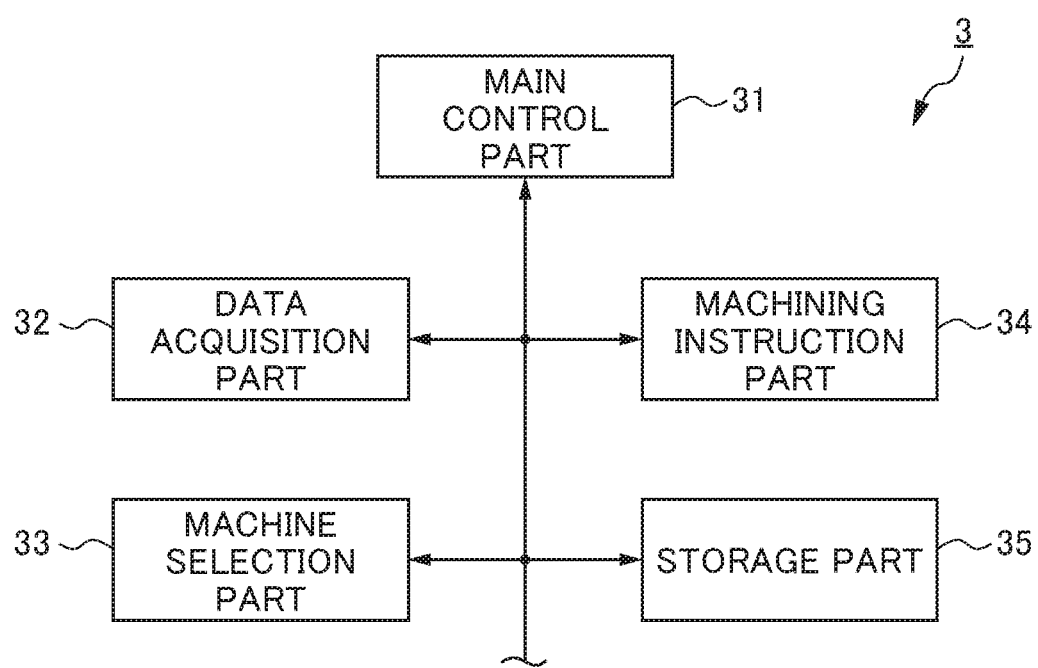
FIG. 2 is a diagram of control blocks of a production management device according to the first embodiment of the present invention.

Hereinafter, the first embodiment of the present invention is described with reference to the drawings. FIG. 1 is a diagram illustrating an overall configuration of a production system according to the first embodiment of the present invention. FIG. 2 is a diagram of control blocks of a production management device according to the first embodiment of the present invention.
Overall Configuration of Production System 1

As shown in FIG. 1, a production system 1 according to the first embodiment is configured to include a master control device 2, a production management device 3, a plurality (for example, 10 to 50 units) of slave control devices 4, and a plurality (for example, 10 to 50 units) of machine tools 5, and is disposed in one factory. The production management device 3 is communicably connected to the master control device 2 via a network, and is also communicably connected to each of the slave control devices 4 via a network. The slave control devices 4 and the machine tools 5 are connected via a wired or wireless network in one-to-one correspondence.

The master control device 2 acquires operation data on all of the machine tools 5 from the production management device 3 via the network, and prepares an overall operation plan of the machine tools 5 on the basis of the operation data.

The production management device 3 is interposed between the master control device 2 and the plurality of slave control devices 4 to maintain the overall operating rate of the plurality of machine tools 5, and includes a main control unit 31 as shown in FIG. 2. The main control unit 31 is connected to a data acquisition unit 32, a machine selection unit 33, a machining instruction unit 34, and a storage unit 35.

The main control unit 31 completely controls the data acquisition unit 32, the machine selection unit 33, the machining instruction unit 34 and the storage unit 35.

The data acquisition unit 32 acquires, in response to a command from the main control unit 31, data on a machine type and an operation condition of each of the plurality of machine tools 5 from each corresponding slave control devices 4. The machine type of each of the machine tools 5 herein means a type such as a lathe, a machining center or an industrial robot. As an example, a lathe and a machining center are regarded as different machine types. The same lathes of different models are regarded as the same machine type. On the other hand, the same lathes which are not replaceable due to different numbers of feed shafts, different numbers of paths, or different tools to be used may be handled as different machine types. The operation condition of each of the machine tools 5 herein means a condition such as an idle state, a stop state for maintenance or inspection, or an unusable state due to generation of an alarm.

The machine selection unit 33 selects an alternative machine tool 5B to be substituted for a specific machine tool 5A and the machining it had been performing among the plurality of machine tools 5, on the basis of the data acquired by the data acquisition unit 32, in response to the command from the main control unit 31.

In response to the command from the main control unit 31, the machining instruction unit 34 gives one of the slave control devices 4 corresponding to the alternative machine tool 5B a command to substitute the alternative machine tool 5B selected by the machine selection unit 33 for the specific machine tool 5A and the machining it had been performing based on the operation plan prepared by the master control device 2.

The storage unit 35 stores, in a freely readable state, machining programs to be executed by the plurality of machine tools 5.

Each of the slave control devices 4 has an automatic adjustment function of automatically adjusting a mechanism driven by an electric motor of each of the machine tools 5 on the basis of a machining program executed by each of the machine tools 5. The object of the automatic adjustment function is to suppress variation in quality at the time of the different machine tools 5 performing similar machining. The automatic adjustment function is to achieve both stability and high-speed responsiveness of a servomotor (not shown) of each of the machine tools 5, by appropriately adjusting at least one of a gain and a filter of the servomotor on the basis of the machining program executed by each of the machine tools 5. It is noted that such an automatic adjustment function in each of the slave control devices 4 is disclosed by, for example, Japanese Patent Publication No. 6050865, and thus the detailed description thereof will be omitted herein.
Processing Flow of Production System 1

Next, a processing flow of the production system 1 is described.

First, the data acquisition unit 32 acquires data on a machine type and an operation condition of each of the plurality of machine tools 5 from each of the slave control devices 4.

Then, the machine selection unit 33 selects, on the basis of the data acquired by the data acquisition unit 32, the alternative machine tool 5B to be substituted for the specific machine tool 5A and the machining it performs among the plurality of machine tools 5. That is, in the case where a certain machine tool 5 stops for some reason and the machining is interrupted while the production system 1 is in operation, the machine selection unit 33 regards this machine tool 5 as a specific machine tool 5A, and selects an alternative machine tool 5B to be substituted for the machine tool 5A and the machining it had been performing among the plurality of machine tools 5.

In this case, the machine selection unit 33 acquires data on a machine type and an operation condition of each of the plurality of machine tools 5, and thus selects, as an alternative machine tool 5B, one of the machine tools 5 of the same type as the specific machine tool 5A and with a lower operating rate than the specific machine tool 5A. The above processing enables the preservation of the overall operating rate of the plurality of machine tools 5.

Then, the machining instruction unit 34 gives one of the slave control devices 4 corresponding to the alternative machine tool 5B a command to substitute the alternative machine tool 5B selected by the machine selection unit 33 for the specific machine tool 5A and the machining it had been performing based on the operation plan prepared by the master control device 2. In this case, the machining instruction unit 34 reads the machining program to be executed by the alternative machine tool 5B from the storage unit 35, and provides the machining program for the slave control device 4 corresponding to the alternative machine tool 5B. Further, in this case, the machining instruction unit 34 gives the slave control device 4 a command to automatically adjust the alternative machine tool 5B.

Upon receipt of the command, the slave control device 4 corresponding to the alternative machine tool 5B exhibits the automatic adjustment function to the alternative machine tool 5B on the basis of an operating condition (for example, condition such as replacement of a work, and aged deterioration of a tool) of the alternative machine tool 5B, and thereafter substitutes the alternative machine tool 5B for the specific machine tool 5A and the machining it had been performing. In response to this, the alternative machine tool 5B executes machining based on the operation plan prepared by the master control device 2, instead of the specific machine tool 5A whose machining has been interrupted.

In this case, the slave control device 4 corresponding to the alternative machine tool 5B is provided with the machining program to be executed by the alternative machine tool 5B from the machining instruction unit 34 of the production management device 3, and thus is able to smoothly execute the machining on the basis of the machining program. This, as a result, enables the preservation of the overall operating rate of the plurality of machine tools 5.

This also enables the suppression of variations in quality at the time of the different machine tools 5A, 5B performing similar machining because the alternative machine tool 5B is adjusted automatically.

Here, the processing flow of the production system 1 ends. As described above, the production system 1 is capable of maintaining the overall operating rate of the plurality of machine tools 5 even when a certain machine tool 5 stops and the machining is interrupted while the production system 1 is in operation, by substituting an alternative machine tool 5 for machining.

OTHER EMBODIMENTS

Although an embodiment of the present invention has been described so far, the present invention is not limited to the embodiment described above. The effects described in the embodiment merely correspond to the most preferable effects produced by the present invention, and the effects produced by the present invention are not limited to those described in the embodiment.

As an example, in the above-described first embodiment, the production system 1 includes the slave control devices 4 and the machine tools 5 communicably connected in one-to-one correspondence, as shown in FIG. 1. Alternatively, the slave control devices 4 and the machine tools 5 may be connected in one-to-many correspondence as an example, and are not limited to one-to-one correspondence.

In the above-described first embodiment, when a slave control device 4 exhibits an automatic adjustment function to an alternative machine tool 5B, a method of adjusting at least one of the gain and the filter of the electric motor of the alternative machine tool 5B is used. Alternatively, another method may be used in place of or in combination with this method.

In the above-described first embodiment, the master control device 2, the production management device 3, the slave control devices 4 and the machine tools 5 are all disposed in one factory. Alternatively, these devices (the master control device 2, the production management device 3, the slave control devices 4, and the machine tools 5) need not be disposed in one factory as long as they are communicably connected to each other. All or some of the master control device 2, the production management device 3 and the slave control devices 4 may be disposed in various servers.

All or part of various servers included in the present invention can be implemented by hardware, software, or a combination thereof. Herein, implementation by software means implementation by a computer that reads and executes a program. When configured with hardware, part or all of a server can be configured with, for example, an integrated circuit (IC) such as LSI (Large-Scale Integrated circuit), ASIC (Application-Specific Integrated Circuit), gate array, or FPGA (Field-Programmable Gate Array).

In the case in which all or part of the functions of various servers included in the present invention is configured with software, a computer may be configured with: a storage unit such as a hard disk or ROM which stores a program describing all or part of the operations of various servers included in the present invention; DRAM which stores data necessary for computation; CPU; and a bus which connects each unit, in which information necessary for computation is stored in the DRAM, and the program is operated in the CPU, whereby all or part of the functions can be implemented.

Respective functions of various servers included in the present invention may be configured to be executed on one or a plurality of servers as appropriate. Respective functions of various servers included in the present invention may be implemented by use of virtual server functions or the like in the cloud.

The program may be stored by use of various types of computer-readable media, and may be supplied to the computer. The computer-readable media include various types of tangible storage media. Examples of the computer-readable media include a magnetic recording medium (e.g., flexible disk, magnetic tape, hard disk drive), a magneto-optical recording medium (e.g., magneto-optical disk), CD-ROM (Read-Only Memory), CD-R, CD-R/W, semiconductor memory (e.g., Mask ROM, PROM (Programmable ROM), EPROM (Erasable PROM), flash ROM and RAM (random access memory)).

EXPLANATION OF REFERENCE NUMERALS

1 . . . PRODUCTION SYSTEM
2 . . . MASTER CONTROL DEVICE
3 . . . PRODUCTION MANAGEMENT DEVICE
4 . . . SLAVE CONTROL DEVICE
5 . . . MACHINE TOOL
32 . . . DATA ACQUISITION PART
33 . . . MACHINE SELECTION PART
34 . . . MACHINING INSTRUCTION PART

What is claimed is:

1. A production management device communicably connected to a plurality of slave control devices respectively connected to a plurality of machine tools, the production management device further being communicably connected to a master control device for preparing an overall operation plan of the plurality of machine tools, the production management device comprising:
a memory configured to store a program; and
a processor configured to execute the program and control the production management device to:
acquire data on a machine type and an operation condition of each of the plurality of machine tools from a respective slave control device of the plurality of slave control devices;

select, on the basis of the data acquired, an alternative machine tool to be substituted for a specific machine tool from among the plurality of machine tools; and give the respective slave control device a command to substitute the alternative machine tool selected for the specific machine tool to perform machining based on the operation plan prepared by the master control device, and give the respective slave control device a command to automatically adjust a mechanism driven by an electric motor of the alternative machine tool.

2. The production management device according to claim 1, wherein the processor is further configured to execute the program and control the production management device to select, as the alternative machine tool, one of the machine tools of the same type as the specific machine tool and with a lower operating rate than the specific machine tool.

3. The production management device according to claim 1, wherein the processor is further configured to execute the program and control the production management device to provide the slave control device with a machining program to be executed by the alternative machine tool, when the slave control device is given the command to substitute the alternative machine tool for the specific machine tool.

4. A production system comprising:
a production management device communicably connected to a plurality of slave control devices respectively connected to a plurality of machine tools, the production management device further being communicably connected to a master control device for preparing an overall operation plan of the plurality of machine tools, the production management device comprising:
   a memory configured to store a program; and
   a processor configured to execute the program and control the production management device to:
      acquire data on a machine type and an operation condition of each of the plurality of machine tools from a respective slave control device of the plurality of slave control devices;
      select, on the basis of the data acquired, an alternative machine tool to be substituted for a specific machine tool from among the plurality of machine tools; and
      give the respective slave control device a command to substitute the alternative machine tool selected for the specific machine tool to perform machining based on the operation plan prepared by the master control device, and give the respective slave control device a command to automatically adjust a mechanism driven by an electric motor of the alternative machine tool; and
   the master control device and the plurality of slave control devices communicably connected to the production management device.

5. The production system according to claim 4, wherein the respective slave control device includes an automatic adjustment function for automatically adjusting a mechanism driven by an electric motor of the machine tool on the basis of a machining program executed by the machine tool.

6. The production system according to claim 5, wherein the respective slave control device adjusts at least one of a gain and a filter of the electric motor of the alternative machine tool in order to achieve the automatic adjustment function for the alternative machine tool.

7. The production system according to claim 5, wherein the respective slave control device achieves the automatic adjustment function for the alternative machine tool on the basis of an operating condition of the alternative machine tool.

* * * * *